United States Patent
Martin

(10) Patent No.: US 10,556,414 B2
(45) Date of Patent: Feb. 11, 2020

(54) METHOD FOR THE FULL-SURFACE CONNECTION OF ANTIPARALLEL CONTACT SURFACES OF A FIRST AND A SECOND JOINING PARTNER BY MEANS OF A BLANK

(71) Applicant: PREH GMBH, Bad Neustadt a. d. Saale (DE)

(72) Inventor: Michael Martin, Unsleben (DE)

(73) Assignee: PREH GMBH, Bad Neustadt A. D. Saale (DE)

( * ) Notice: Subject to any disclaimer, the term of this patent is extended or adjusted under 35 U.S.C. 154(b) by 150 days.

(21) Appl. No.: 15/924,954

(22) Filed: Mar. 19, 2018

(65) Prior Publication Data

US 2018/0264794 A1 Sep. 20, 2018

(30) Foreign Application Priority Data

Mar. 20, 2017 (DE) .................. 10 2017 105 935

(51) Int. Cl.
*B32B 37/12* (2006.01)
*H05K 5/00* (2006.01)

(52) U.S. Cl.
CPC ...... *B32B 37/12* (2013.01); *B32B 2037/1253* (2013.01); *H05K 5/0017* (2013.01)

(58) Field of Classification Search
CPC .................................................. B32B 37/12
See application file for complete search history.

(56) References Cited

U.S. PATENT DOCUMENTS

2013/0101827 A1* 4/2013 Chen ................... B32B 37/12
428/323
2014/0220286 A1* 8/2014 Honeycutt ........ B32B 17/10036
428/41.8

FOREIGN PATENT DOCUMENTS

| DE | 10024695 A1 | 11/2001 |
| DE | 102009024324 A1 | 12/2010 |
| FR | 2527515 A1 | 12/1983 |

* cited by examiner

*Primary Examiner* — Daniel Mcnally
(74) *Attorney, Agent, or Firm* — M&B IP Analysts, LLC

(57) ABSTRACT

The present disclosure relates to a method for the full-surface connection of contact surfaces, which form a cavity between them and extend in an antiparallel manner, of a first, transparent joining partner and a second joining partner, comprising the steps of: providing and arranging the first joining partner, the second joining partner and a blank made of an elastic material, such that the blank is disposed in the cavity formed between the contact surfaces extending in an antiparallel manner, and wherein the blank has an outer adhesive layer; heating the blank by irradiation with microwave radiation and/or infrared radiation (IR); curing or cross-linking the adhesive layer of the blank in order to form a layer structure of the first joining partner, the blank and the second joining partner.

18 Claims, 1 Drawing Sheet

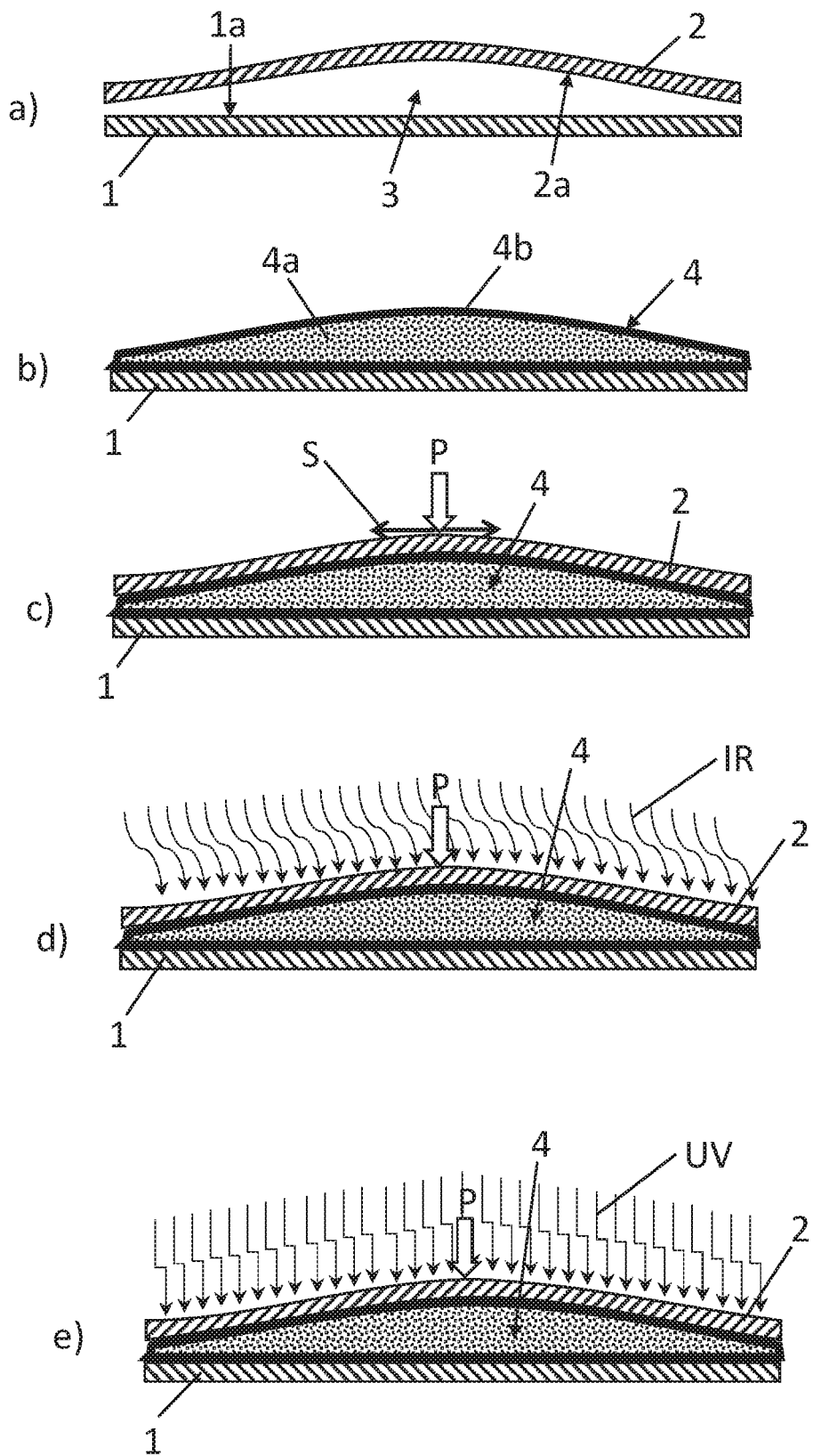

METHOD FOR THE FULL-SURFACE CONNECTION OF ANTIPARALLEL CONTACT SURFACES OF A FIRST AND A SECOND JOINING PARTNER BY MEANS OF A BLANK

This application claims priority to the German Application No. 10 2017 105 935.0, filed Mar. 20, 2017, now pending, the contents of which are hereby incorporated by reference.

The present disclosure relates to a method for connecting, in particular gluing together, opposite contact surfaces of a first and second joining partner, in particular for connecting a transparent protective layer, for example consisting of polycarbonate, preferably of polymethylmetacrylate (PMMA), as a first joining partner, to an outer layer of an electronic pixel matrix display as a second joining partner. Gluing two joining partners together is generally subject to the requirement of spreading the adhesive as uniformly as possible and as thinly as possible in the cavity which is formed between the joining partners and defined by the contact surfaces, and of avoiding inclusions of air in the process, and in particular of avoiding the formation of optically interfering inclusions in the process if one of the joining partners is an electronic pixel matrix display. This problem has particular relevance if the contact surface of one joining partner is non-planar, for example due to the manufacturing process of the latter. In this case, a common procedure is to bend one of the joining partners in such a way that the contact surface curves away from the other contact surface, so that, if one of the contact surfaces is previously coated with an adhesive and if the contact surface is brought closer until the adhesive layer is contacted by the other contact surface, a local, mostly linear wetting occurs, which then gradually expands to result in a full-surface wetting when the bending is relieved. Though this procedure is suitable for flexible films, it is unsuitable for comparatively thick and rigid joining partners. It is particularly challenging if the two joining partners, particularly their contact surfaces that are to be joined, form a non-uniform cavity due to the contact surfaces extending in an antiparallel manner, i.e., if a situation results in which the clear distance between the joining partners is not constant along the extent of the contact surface. The known procedures fail to establish a connection subject to the requirement that a uniform filling of the cavity which avoids inclusions of air is to be obtained.

Therefore, the object of the present disclosure is to provide a method for connecting two contact surfaces, which extent in an antiparallel manner relative to one another, of two joining partners, in which a continuous layer free from any inclusions of air is formed between the joining partners comparatively simply and a durable layer structure, as a whole, is obtained. This object is achieved by means of a method according to claim 1. Advantageous embodiments are in each case the subject matter of the dependent claims. It must be remarked that the features cited individually in the patent claims can be combined in any technologically meaningful manner and depict other embodiments of the present disclosure. The description, in particular in connection with the figures, additionally characterizes and specifies the present disclosure.

According to the present disclosure, the inventive method for the full-surface connection of contact surfaces, which form a cavity between them and extend in an antiparallel manner relative to one another, of a first and a second joining partner comprises the following steps.

In a step of providing and arranging, the first transparent joining partner, the second joining partner and a blank made of elastic material are arranged in such a way that the blank is disposed in the cavity formed between the joining partners. This is done, for example, by placing the blank on the contact surface of one of the joining partners of the first or second joining partners and subsequently arranging the remaining joining partner in such a manner that the cavity formed between the joining partners is at least partially filled by the blank. According to the present disclosure, the blank has an outer adhesive layer, i.e. an adhesive layer intended for the adjacent arrangement to the first or second joining, partner. A peel strength of 0.05 to 0.15 N/cm is understood to be a sufficient adhesiveness in the sense of an adhesive layer according to the present disclosure.

The arrangement according to the present disclosure is such that the blank, via the adhesive layer, is disposed adjacent to the contact surface of the first joining partner and adjacent to the contact surface of the second joining partner. In the sense of the present disclosure, such an extent is considered to be "antiparallel" in which the contact surfaces cannot be brought into full contact due to the deviating extent and a cavity remains between the joining partners even in the case of partial contact. "Antiparallel" in the sense of the present disclosure is not to be interpreted narrowly; e.g., an extent of the contact surfaces that is parallel in some areas is not supposed to be contrary to the qualification according to the present disclosure as "antiparallel" in the sense of the present disclosure. For example, the maximum distance is in the range of 0.08 to 3.0 mm, preferably in the range of 0.1 to 1.0 mm.

According to the present disclosure, there is also provided a step of heating the blank including the adhesive layer by means of irradiation with microwave radiation and/or infrared radiation, in order to obtain a better adaptation of the shape to the cavity and/or better adherence of the blank to the contact surfaces, for example, by means of the altered viscosity and/or the altered adhesiveness of the adhesive layer.

Curing and/or cross-linking the adhesive layer of the blank takes place in a subsequent step, in order to form a layer structure of the first joining partner, the blank and the second joining partner. A durable connection in the layer structure is thus obtained. Preferably, curing and/or cross-linking takes place exclusively in the region of the adhesive layer, so that the elastic properties of the remaining rest of the blank are maintained.

By using, in accordance with the present disclosure, a blank made from a substantially elastic, preferably viscoelastic, material, a complete, inclusion-free filling of the cavity is achieved without the material filling the cavity flowing out of the cavity. For example, an elasticity higher than that of the material of the first and second joining partners is understood to be elastic.

For example, the blank is a gel cushion.

Preferably, the blank, at least while being arranged, has a viscosity selected from the range of 500 mPas and 5000 mPas.

According to one embodiment, the cavity is defined by at least one convex or concave, preferably concave, contact surface out of the first contact surface and the second contact surface. A curvature of the contact surface of the respective joining partner directed towards the interior thereof is understood to be concave. An opposite curvature is understood to be convex.

According to another embodiment of the method, the cavity is defined by a planar, i.e., flat, contact surface out of the first contact surface and the second contact surface.

In one embodiment, the cross-linking of the adhesive layer is achieved by irradiating the blank with ultraviolet (UV) light. Preferably, UV irradiation is carried out through one of the joining partners out of the first and second joining partners.

Preferably, the blank is pre-shaped prior to being arranged in the cavity, i.e., the blank has an outer contour adapted to the cavity prior to being introduced into the cavity.

In one embodiment, the adhesive property is an inherent property of the material of the blank. The blank including the adhesive layer is thus formed homogeneously. In another embodiment, the adhesive property is obtained by a surface treatment, e.g. by irradiating or wetting with a chemically reactive component in an outer layer of the blank. For example, the adhesive layer has a thickness of a few tens of micrometers.

In accordance with a preferred variant of the method, the blank is coated with an adhesive layer in a coating step preceding the arrangement of the blank, in order to increase the adhesiveness of the blank on the first and/or second joining partner.

According to another embodiment, the adhesive of the adhesive layer is a thermally activated adhesive, and the respective adhesive of the adhesive layer of the blank is activated in the step of heating the blank. The requirement of an activation more easily enables a simple pre-positioning of the blank and a possibly necessary subsequent positioning of the blank prior to activation.

Consequently, according to a preferred embodiment of the method, the heating step is preceded in time by a step of relatively aligning the first joining partner, the second joining partner and the blank.

According to a preferred embodiment, the adhesive is a radiation-curing adhesive or an adhesive that cross-links due to the influence of moisture, such as a silane-cross-linking polymer adhesive. An ambient air humidity exceeding a relative air humidity of 50% is understood to be an influence of moisture. Thus, a durable connection between the blank and the respective contact surface can be obtained by means of the influence of moisture or by the influence of UV radiation.

Preferably, the layer structure is subjected to pressure at least during the heating and/or cross-linking step in order to obtain a minimum distance between the joining partners.

According to another embodiment, at least the first joining partner and the blank are configured to be translucent, preferably transparent, at the latest subsequent to, preferably at the latest during, curing and/or crosslinking.

According to a preferred variant, the first joining partner is an electronic pixel matrix display. Preferably, the contact surface is defined by a transparent cover layer of the pixel matrix display. In this case, the blank also has the function, due to its elasticity, of protecting the pixel matrix display against damage and/or pressure-related faulty displays that may result from the impact of forces on the second joining partner.

Preferably, the cavity is subjected to negative pressure after arranging the blank in order to obtain an improved filling of the cavity with the material of the blank.

According to another preferred variant of the method, the cavity is wetted with a liquid, preferably with a volatile liquid, such as an alcohol, prior to arranging the blank, in order to facilitate the arrangement and alignment of the blank, in particular to obtain a bubble-free coverage of the respective contact surface by the blank.

One embodiment provides that the second joining partner is formed to be non-planar on its main surface, which is opposite to its contact surface. For example, the respective joining partner has a convex curvature.

According to one embodiment, the second joining partner is made of transparent polymethylmetacrylate (PMMA). Preferably, the second joining partner is made of a glass material, such as a silicate glass material.

The present disclosure is explained in more detail with reference to the following FIGURE. The FIGURE is to be understood only as an example and merely represents a preferred embodiment. In the drawing:

FIG. 1: substantially shows a schematic flow chart of the method according to the present disclosure.

The method according to the present disclosure as shown in FIG. 1 serves for connecting, in particular gluing together, a first joining partner 1 and a second joining partner 2. With reference to FIG. 1a), the problem solved by the method according to the present disclosure is to be explained, which results from the fact that the contact surfaces 1a or 2s of the joining partners 1 or 2 are antiparallel relative to one another, and that therefore, the cavity 3 formed between the contact surfaces 1a and 2a is comparatively difficult to fill with a filling material while avoiding inclusions. Such an inclusion-free filling is intended, for example, if a pixel matrix display, as a first joining partner 1, is to be connected with a transparent cover layer, as the second joining partner 2, via a transparent filling material to be introduced into the cavity 3. For example, the cover layer is made of a transparent plastic or transparent glass material. Such cover layers, as a second joining partner, usually have raised portions facing towards the operator, which are accompanied by a concave curvature formed on the side facing away from the operator. This problem of filling the cavity 3 uniformly while sufficiently and permanently connecting the two joining partners 1, 2 at the same time is solved by the method according to the present disclosure as shown in the subsequent steps b) to e) in FIG. 1.

For this purpose, a blank 4 made of a substantially transparent and viscoelastic material is applied to the first joining partner 1. For example, the blank has a gel cushion 4a, as shown. The blank 4 already has an outer contour matching the cavity 3 and, moreover, is coated with a thermally activated adhesive, whereby the blank forms an outer adhesive layer 4b. During application, the thermal adhesive of the adhesive layer 4b is not yet activated, which facilitates application and alignment of the blank 4 and, if necessary, its repositioning on the first joining partner 1, due to the adhesiveness of the adhesive layer 4b being lower in comparison with the activated state. In the meantime, the contact surface of the first joining partner 1 can additionally be wetted with a volatile liquid, such as an alcohol, in order to facilitate the bubble-free application of the blank 4.

In a subsequent step, as shown in FIG. 1c), the second blank 2 is applied to the blank 4, so that the blank 4 largely fills the cavity formed between the first joining partner 1 and the second joining partner 2. The layer structure consisting of the first joining partner 1 and the second joining partner 2 is subjected to a pressure as symbolized by the arrow P, in order to obtain a complete filling of the cavity with the material of the blank 4. At the same time, a repositioning of the second joining partner 2 relative to the first joining partner 1, which is indicated by the double arrow S, may also be carried out if necessary.

In a subsequent step shown by FIG. 4d), the layer structure, in particular the blank 4, is subjected to a heat treatment by means of infrared irradiation IR while the application of pressure P is maintained, in order to activate the adhesive of the adhesive layer 4b on the one hand and, on the other hand, to increase the elasticity 4a of the blank 4. The heating and thus the activation of the adhesive layer 4b provides for the formation of an adhesive composite consisting of the first joining partner 1, the second joining partner 2 and the blank 4. In a subsequent step, the blank 4, in particular the adhesive layer 4b thereof, is cross-linked by means of irradiation with ultraviolet radiation UV. Thus, the adhesive of the adhesive layer 4b cross-links, and a solid composite consisting of the joining partner 1, the second joining partner 2 and the blank 4 is obtained.

What is claimed is:

1. A method for a full-surface connection of contact surfaces, which form a cavity between them and extend in an antiparallel manner, of a first transparent joining partner and a second joining partner, comprising the following steps:
   providing and arranging the first joining partner having a first contact surface, the second joining partner having a second contact surface, and a blank made of an elastic material, such that the blank is disposed in the cavity formed between the first contact surface and second contact surface extending in an antiparallel manner, and wherein the blank has an outer adhesive layer;
   heating the blank by irradiation with microwave radiation or infrared radiation (IR); and
   curing or cross-linking the adhesive layer of the blank in order to form a layer structure of the first joining partner, the blank and the second joining partner.

2. The method of claim 1, wherein cross-linking is effected by ultraviolet (UV) irradiation of the adhesive layer.

3. The method of claim 2, wherein the UV irradiation takes place through the first joining partner.

4. The method of claim 1, wherein the blank, in a coating step preceding the arranging, is coated with an adhesive for forming the adhesive layer.

5. The method of claim 4, wherein the adhesive of the adhesive layer of the blank is activated in the heating step.

6. The method of claim 1, wherein the second joining partner, the blank, and the adhesive layer are transparent after curing and/or cross-linking.

7. The method of claim 6, wherein the first joining partner is an electronic pixel matrix display.

8. The method of claim 1, wherein the cavity is defined by at least one concave or convex contact surface of the first contact surface and the second contact surface.

9. The method of claim 1, wherein the cavity is defined by a planar contact surface of the first contact surface and the second contact surface.

10. The method of claim 1, wherein the blank is pre-shaped prior to being arranged in the cavity.

11. The method of claim 1, wherein the adhesive of the adhesive layer is a radiation-curing adhesive or an adhesive cured due to the influence of moisture.

12. The method of claim 1, wherein the layer structure is subjected to pressure at least during the heating or cross-linking step.

13. The method of claim 1, wherein the heating step is preceded by a step of aligning the first joining partner, the second joining partner, and the blank.

14. The method of claim 1, wherein the cavity is subjected to negative pressure after arranging the blank.

15. The method of claim 1, wherein the cavity is wetted with a volatile liquid prior to arranging the blank.

16. The method of claim 1, wherein the blank has a viscosity within the range of 500-5000 mPas while being arranged.

17. The method of claim 1, wherein the second joining partner is formed to be non-planar on a main surface opposite to its contact surface.

18. The method of claim 1, wherein the second joining partner is made of a glass material.

* * * * *